United States Patent
Sinha et al.

(10) Patent No.: US 11,126,759 B2
(45) Date of Patent: Sep. 21, 2021

(54) ADDING CONSTRAINTS BETWEEN COMPONENTS OF A COMPUTER-AIDED DESIGN (CAD) MODEL

(71) Applicant: Dassault Systemes SolidWorks Corporation, Waltham, MA (US)

(72) Inventors: Sushant Sinha, Pune (IN); Nick Birkett-Smith, Cambridge (GB); Christopher George Brooking, Cambridge (GB)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 531 days.

(21) Appl. No.: 15/810,660

(22) Filed: Nov. 13, 2017

(65) Prior Publication Data

US 2018/0365343 A1    Dec. 20, 2018

Related U.S. Application Data

(60) Provisional application No. 62/520,688, filed on Jun. 16, 2017.

(51) Int. Cl.
    *G06F 30/17*    (2020.01)
    *G06F 30/15*    (2020.01)
    *G06F 111/04*   (2020.01)

(52) U.S. Cl.
    CPC ............ *G06F 30/17* (2020.01); *G06F 30/15* (2020.01); *G06F 2111/04* (2020.01)

(58) Field of Classification Search
    CPC .......... G06F 30/00; G06F 30/17; G06F 30/15; G06F 2111/04
    USPC ........................................................... 703/1
    See application file for complete search history.

(56) References Cited

U.S. PATENT DOCUMENTS

| 2006/0290695 A1* | 12/2006 | Salomie | G06T 17/20 345/420 |
| 2009/0187385 A1* | 7/2009 | Zegdoun | G06T 17/20 703/1 |
| 2010/0010655 A1* | 1/2010 | Corcoran | G06F 30/00 700/98 |

OTHER PUBLICATIONS

Brentano, Lewis D. "Data Communications, CAD/CAM Graphics and Distributor Design Concepts." Computer Graphics. Springer, Berlin, Heidelberg, 1983. pp. 222-246. (Year: 1983).*

(Continued)

*Primary Examiner* — Kamini S Shah
*Assistant Examiner* — John E Johansen
(74) *Attorney, Agent, or Firm* — Hamilton, Brook, Smith & Reynolds, P.C.

(57) ABSTRACT

The disclosed methods and systems allow adding constraints ("mates") between components of the CAD model when in a graphics mode (i.e., when bodies of the CAD model are not loaded). Information regarding CAD model entities is accessed from a computer database, where the CAD model entities belong to one or more components of the subject CAD model. A graphical representation of the subject CAD model is presented to a user without loading bodies of the subject CAD model. The user is enabled to add a constraint between first and second entities of the subject CAD model, and information for the added constraint is stored with the subject CAD model in the computer database. Displaying the model in graphics mode saves time as well as memory usage, and the added constraints persistent after resolving the components from the graphics mode.

21 Claims, 7 Drawing Sheets

(56) References Cited

OTHER PUBLICATIONS

Mukherjee, Amit, and C. R. Liu. "Conceptual design, manufacturability evaluation and preliminary process planning using function-form relationships in stamped metal parts." Robotics and Computer-Integrated Manufacturing 13.3 (1997). pp. 253-270. (Year: 1997).*
Puodžiūnienė, N. "Review of Contemporary CAD Systems in Industry and Education." Mechanika 18.2 (2012). pp. 246-250. (Year: 2012).*
Darvishi, A. R., and K. F. Gill. "Expert system rules for fixture design." The International Journal of Production Research 28.10 (1990). pp. 1901-1920. (Year: 1990).*
DEVELOP3D Software Review. Oct. 2011. https://develop3d.com/reviews/solidworks-2012/. Internet Archine date Oct. 3, 2011. p. 1-11. (Year: 2011).*

\* cited by examiner

ADDING CONSTRAINTS BETWEEN COMPONENTS OF A COMPUTER-AIDED DESIGN (CAD) MODEL

RELATED APPLICATION

This application claims the benefit of U.S. Provisional Application No. 62/520,688, filed on Jun. 16, 2017. The entire teachings of the above application are incorporated herein by reference.

BACKGROUND

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. CAD systems may combine solid modeling and other modeling techniques, such as parametric modeling techniques. Parametric modeling techniques can be used to define various parameters for different features and components of a model, and to define relationships between those features and components based on relationships between the various parameters.

A design engineer is a typical user of a 3D CAD system. The design engineer designs physical and aesthetic aspects of 3D models, and is skilled in 3D modeling techniques. The design engineer creates parts and may assemble the parts into a subassembly. A subassembly may also consist of other subassemblies. An assembly is designed using parts and subassemblies. Parts and subassemblies are hereinafter collectively referred to as components.

The following are definitions of certain terms that can be used when describing a 3D CAD system.

Assembly: A document in which parts, features, and other assemblies (subassemblies) are mated together. Parts and subassemblies can exist in documents separate from the assembly. For example, in an assembly, a piston can be mated to other parts, such as a connecting rod or cylinder. This assembly can then be used as a subassembly in an assembly of an engine.

Body: A solid body includes topological data and geometric data. The topological data (e.g., faces, edges, and vertices) in a solid body have corresponding geometric data in the same solid body. Each vertex corresponds to a point. Each edge corresponds to a curve. Each face corresponds to a surface. An example multi-body part for a wheel can include an axle body, rim body, and a number of spoke bodies to connect the axle and rim bodies.

Component: Any part or subassembly within an assembly.

Edge: A single outside boundary of a feature.

Entity: A discrete element, such a face, edge, vertex, etc.

Face: A selectable area (planar or otherwise) of a model or surface with boundaries that help define the shape of the model or surface. For example, a rectangular solid has six faces, and a cylindrical solid has three faces.

Feature: An individual shape that, combined with other features, makes up a part or assembly.

Large Design Review: A mode of assembly review that allows a very large assembly to open quickly, while still retaining capabilities that are useful when conducting design reviews of assemblies. In large design review mode, a user can: Navigate a design tree of the assembly, measure distances, create cross sections, hide and show components, and create, edit, and play back walk-throughs. Large design review mode can also be referred to as "Graphics Mode."

Lightweight: A part in an assembly that has only a subset of its model data loaded into memory. The remaining model data is loaded on an as-needed basis. Lightweight improves performance of large and complex assemblies.

Mate: A geometric relationship between entities (e.g., parts or bodies) in an assembly. Example mates include angle, coincident, concentric, distance, parallel, perpendicular, and tangent.

Figure 1:
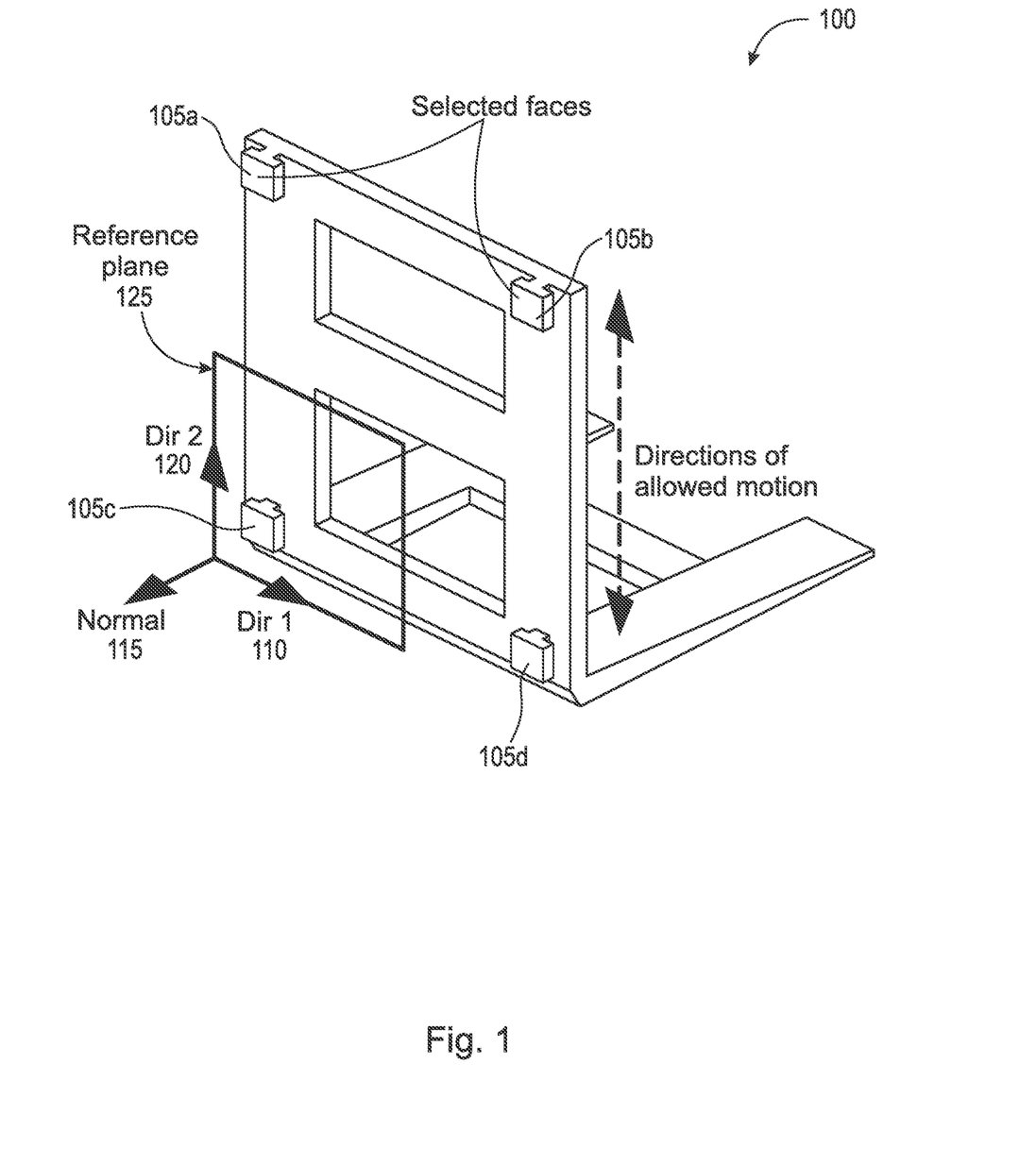
FIG. 1 is an illustration of a reference plane of an example CAD part.

Reference Plane: A plane used as a reference to apply constraints. Using an example reference plane 125 of a part 100, as depicted in FIG. 1, selected faces 105*a-d* can be constrained, for example, along Dir 1 110 and the Normal direction 115, which leaves the selected faces free to move along Dir 2 120.

Part: A single 3D object made up of features. A part can include multiple bodies. A part can become a component in an assembly. Examples of parts include, for example, a bolt, pin, and plate.

Plane: A flat construction geometry.

Point: A singular location in a 3D model.

Resolved: A state of an assembly component in which it is fully loaded in memory. When resolved, all of the component's model data is available, so its entities can be selected, referenced, edited, used in mates, etc.

Subassembly: An assembly that is part of a larger assembly. For example, a steering mechanism of a car is a subassembly of the car.

Surface: A zero-thickness planar or 3D entity with edge boundaries.

Vertex: A point at which two or more edges intersect. Vertices can be selected for sketching, dimensioning, and many other CAD operations.

A solid modeling system may be a feature-based 3D CAD system wherein a part is constructed using various features. Examples of features include bosses, fillets, chamfers, cuts, holes, shells, lofts, and sweeps. CAD systems store the contents of parts, subassemblies, and assemblies in one or more data files. In addition to features, the contents of CAD data files may include design profiles, layouts, bodies, and graphical entities. CAD systems may define components in a variety of ways. For example, a CAD system may define each part in a separate file. Known by those of ordinary skill in the art, a part file can be defined as a storage structure (which may also be referred to as a container). Within the storage structure, one or more storage streams can be contained. One storage stream may define primitive data structures; another storage stream may define various features and the feature history; yet another storage stream may contain a display list, graphic elements, or both that are used to create an image of the part on a computer monitor. The contents of these storage streams may vary from one CAD application to another, and from implementation to implementation.

Parts, subassemblies, and assemblies can be quite complicated. A model containing 10,000 parts is not uncommon. For example, CAD models of agricultural vehicles, recreational vehicles, and some printer devices may likely have more than 10,000 parts. Some design engineers may need to wait up to thirty minutes for a CAD system to open a model, and up to one minute for the completion of a basic operation, such as dragging a part on the computer screen from one location to another, highlighting a part, or mating two components. The more complex a model (e.g., the greater the number of components), the greater the load on the CAD system. The length of time needed to generate a component is a function of a number of factors, including the configuration of the computer system on which the modeling application runs. The amount of memory and the speed of the hardware processors installed on the computer system affect the performance of the modeling application. Additionally, the level of detail of the component being generated and the functionality that can be supported by the component influence the performance of the modeling application because both affect the amount of data that is stored, loaded, and processed.

A typical CAD system needs to load into memory the bodies of the components of a CAD model in order to constrain the components (i.e., create mates between components). The loading of these bodies is very time and memory consuming for large assemblies with many components. A CAD system may present a large assembly more quickly in a large design review mode (also referred to as "graphics mode") without loading the bodies, but the user cannot then add constraints between components of the assembly.

SUMMARY

The disclosed methods and systems allow a user to add constraints ("mates") between components of a CAD model when working with the model in a graphics mode (i.e., when bodies of the CAD model are not loaded). One example embodiment is a computer-implemented method of adding constraint information between entities (e.g., faces, edges, and points) in a subject computer-aided design (CAD) model of a real-world object. According to the method, information regarding CAD model entities is accessed from a computer database, where the CAD model entities belong to one or more components of the subject CAD model. A graphical representation (e.g., in large design review mode) of the subject CAD model is presented to a user without loading bodies of the subject CAD model. The method enables the user to add a constraint between first and second entities of the subject CAD model, and stores information for the added constraint with the subject CAD model in the computer database.

Another example embodiment is a CAD system that includes a computer database and a processor operatively coupled to the computer database. The computer database stores information regarding CAD model entities, where the CAD model represents a real-world object, and the processor (i) accesses information regarding CAD model entities from the computer database, (ii) presents to a user a graphical representation of the subject CAD model without loading bodies of the CAD model, (iii) enables the user to add a constraint between first and second entities of the subject CAD model, and (iv) stores information for the added constraint with the subject CAD model in the computer database.

Another example embodiment is a computer-readable data storage medium having computer-readable program codes embodied therein for adding constraint information between entities in a subject CAD model of a real-world object. The computer-readable data storage medium program codes include instructions that, when executed by a processor, cause the processor to (i) access information regarding CAD model entities from a computer database, where the CAD model entities belong to one or more components of the subject CAD model, (ii) present to a user a graphical representation of the subject CAD model without loading bodies of the subject CAD model, (iii) enable the user to add a constraint between first and second entities of the subject CAD model, and (iv) store information for the added constraint with the subject CAD model in the computer database.

In some embodiments, presenting the graphical representation of the subject CAD model can include accessing only point information (e.g., vertices) for the subject CAD model from the computer database.

In some embodiments, enabling the user to add the constraint between first and second entities can include (i) in response to the user selecting the first entity, creating a first reference plane in memory, (ii) in response to the user selecting the second entity, creating a second reference plane in memory, (iii) enabling the user to specify a type of constraint to be added between the first and second entities, and (iv) creating constraint information based on the type of constraint specified by the user and the first and second reference planes. In such embodiments, enabling the user to specify a type of constraint includes presenting to the user constraint types that are available between the first and second entities selected by the user. Additionally, in such embodiments, creating the first and second reference planes can include (i) accessing node information for the first and second entities from the computer database, (ii) associating node information for the first entity with the first reference plane, and (iii) associating node information for the second entity with the second reference plane. Additionally, in such embodiments, creating the constraint information can include creating constraint information that includes the constraint type specified by the user and the node information associated with the first and second reference planes.

In some embodiments, storing information for the added constraint can include adding the information for the added constraint to a constraint data stream for the subject CAD model.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

CAD software can provide the user with a mode for viewing large, complex designs. Such a mode can be referred to as a "graphics mode" or "large design review" and allows the user to open very large assemblies quickly, while still retaining some capabilities that are useful when conducting design reviews of assemblies. When opening an assembly in large design review mode, the user can, for example, navigate a feature design tree, measure distances, create cross-sections, hide and show components, and create, edit, and play-back walk-throughs. Normally, large design review is primarily intended as an environment for quick design reviews. Not normally accessible in large design review mode are assembly features, component patterns, and constraints. To edit a CAD model, the user must normally open the assembly as fully resolved or in a lightweight editing mode.

Figure 2:
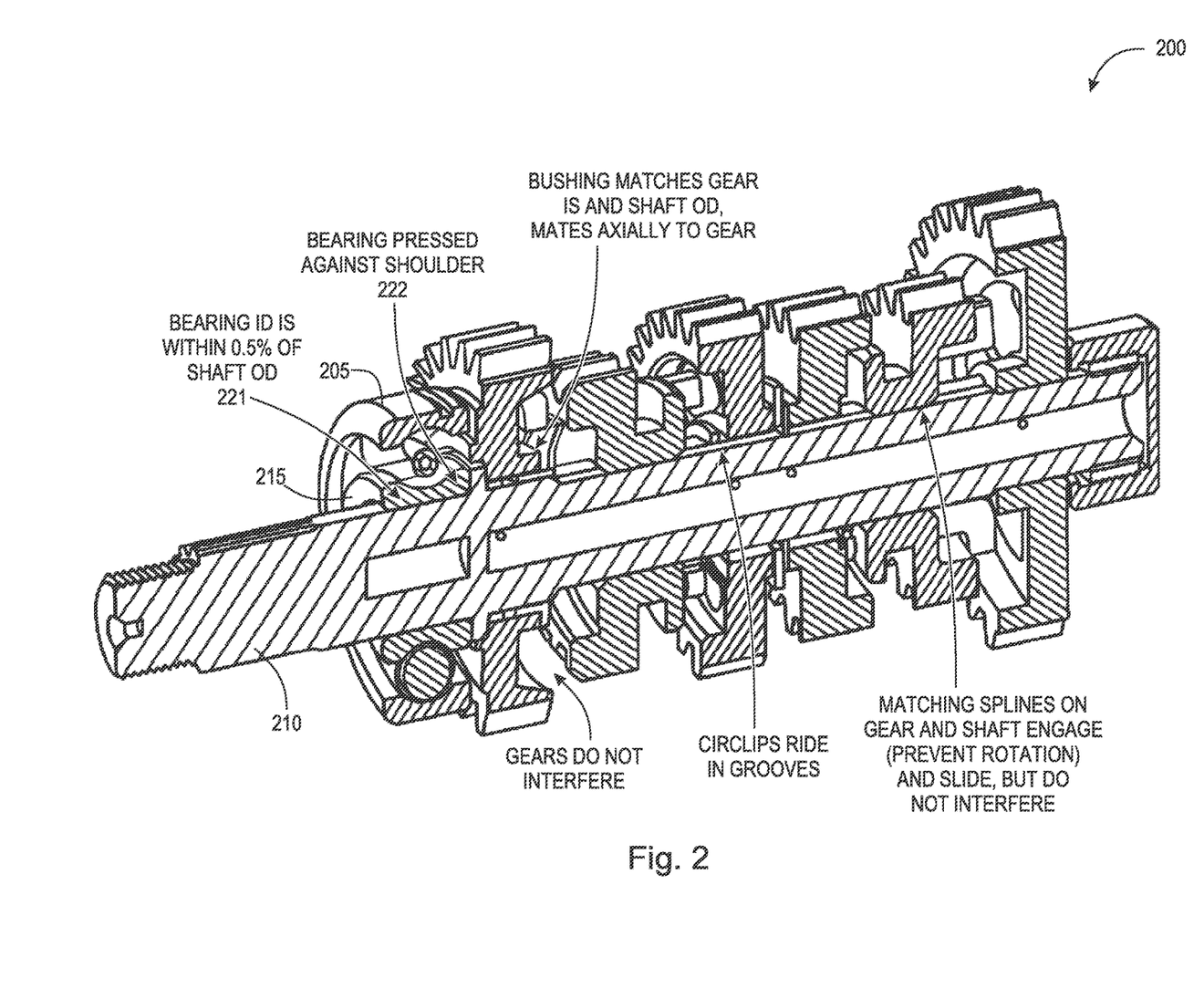
FIG. 2 is an illustration of an annotated CAD model.
Figure 3:
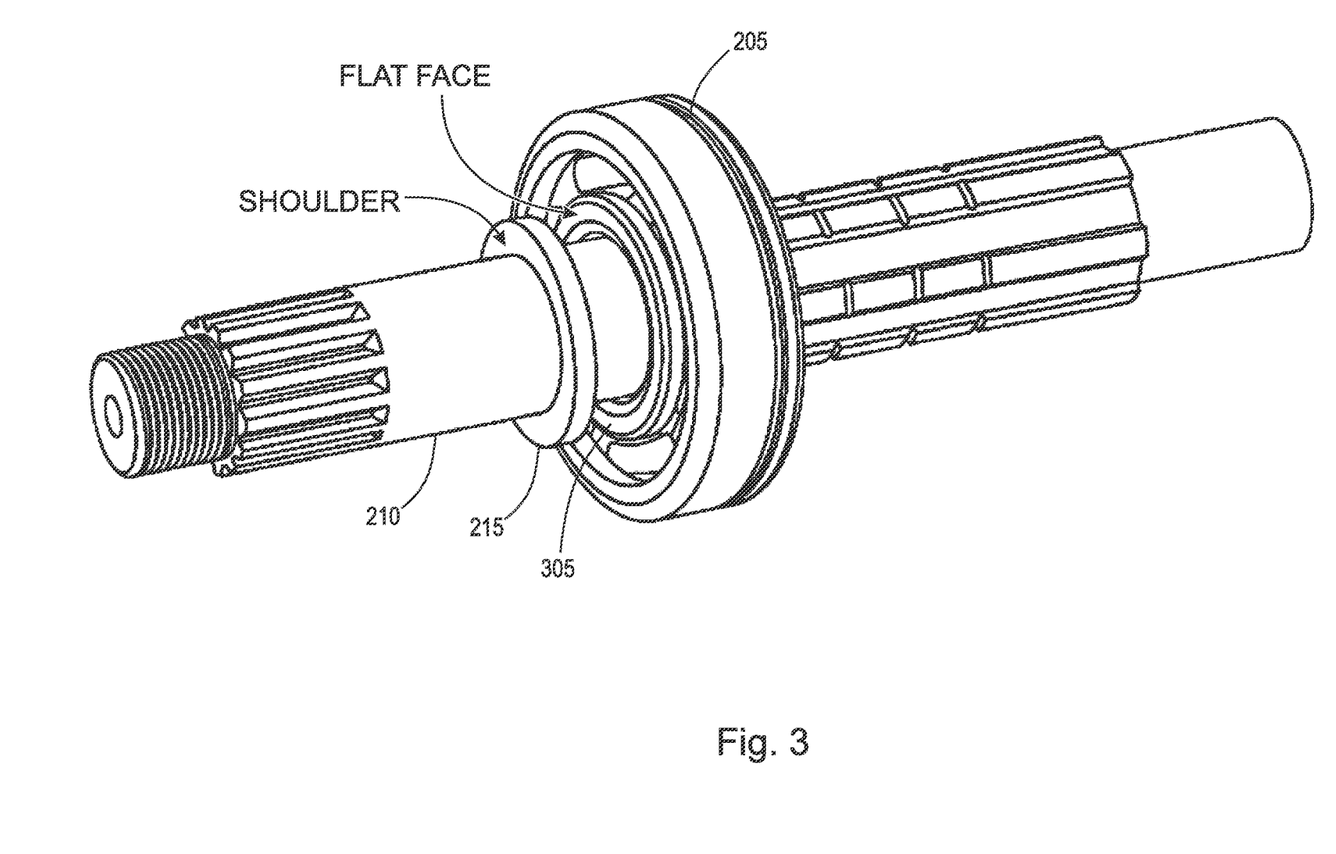
FIG. 3 is an illustration of annotated components of the CAD model of FIG. 2.

The embodiments disclosed herein enable design engineers of all experience levels to add constraints between components in a CAD model while in large design review mode. FIGS. 2 and 3 illustrate components of a CAD model 200, and annotations imparting knowledge that a design engineer may consider when designing such a model 200, including how components of the model 200 may be constrained.

FIG. 2 illustrates a computer-generated model 200 with various annotations. For example, a bearing component 205 can be mated with a shaft component 210 such that the inner diameter (ID) of the bearing 205 is within 0.5% of the outer diameter (OD) of the shaft 210, as indicated by a tolerance annotation 221. Another annotation 222 specifies that the bearing component 205 should be pressed against a shoulder 215 of the shaft component 210.

FIG. 3 illustrates an example mating of the bearing 205 and shaft 210 components. As shown in FIG. 3, a flat face 305 of the bearing 205 may be mated to a shoulder 215 of the shaft 210.

Figure 4:
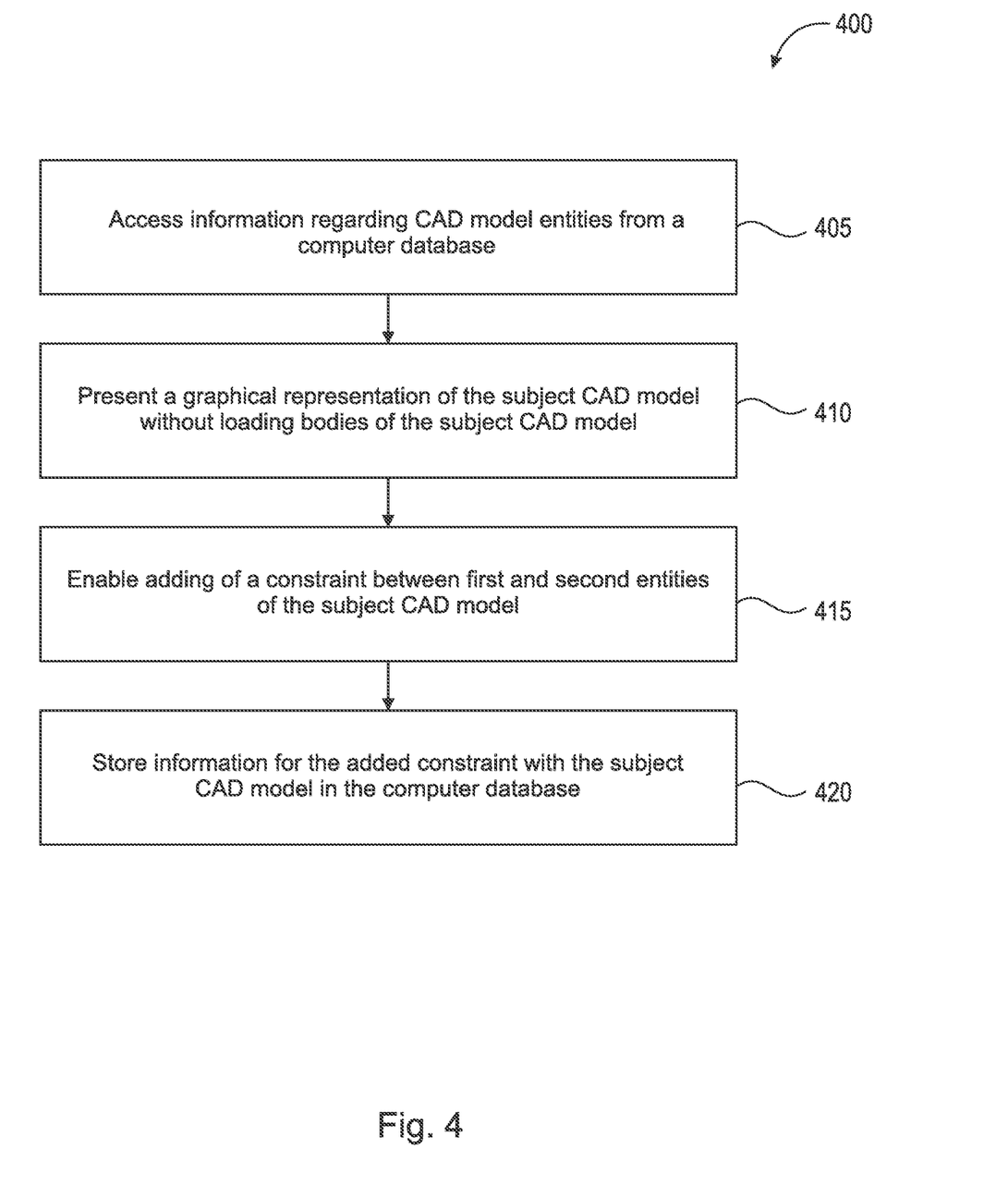
FIG. 4 is a flow diagram illustrating adding constraints between entities in a subject CAD model, according to an example embodiment.

FIG. 4 is a flow diagram illustrating an example method 400 of adding constraints between entities in a subject CAD model, according to an example embodiment. The method 400 includes accessing 405 information regarding CAD model entities from a computer database, where the CAD model entities belong to one or more components of the subject CAD model. A graphical representation of the subject CAD model is presented 410 to a user without loading bodies of the subject CAD model. The method 400 enables 415 the user to add a constraint between first and second entities of the subject CAD model, and stores 420 information for the added constraint with the subject CAD model in the computer database.

In a particular application of the example method 400, a user opens a CAD model assembly in graphics mode. The user selects a first face of a component of assembly. A first reference plane is then created, in memory, and the face ID and/or edge IDs associated with the first face are stored as being associated with the first reference plane. The reference plane can be defined by a point on the plane and the "normal" to the plane. The face ID may include all nodes that are part of the first face, and the edge IDs may include pairs of nodes, which can be obtained from the component entity information stored for the model. The user then selects a second face in the assembly. A second reference plane is then created, in memory, and the face ID and/or edge IDs associated with the second face are stored as being associated with the second reference plane. The user may then add a constraint between the two selected faces by, for example, selecting a constraint type from a list of available constraint types for the two components (e.g., coincidence constraint, parallel constraint). Constraint information is created and stored, temporarily, when in large design review mode. The user may add additional constraints in the same manner. The constraint information can be saved in the constraint data stream for the assembly if the changes made while in large design review are saved. The constraint stream can include a number of constraint entries. A constraint entry can include information such as, for example, constraint type and entities associated with the constraint. An example constraint entry can include: an identification of a parallel constraint and an identification of two faces of the assembly, along with associated node information.

When manipulating the assembly (e.g., rotating or translating components of the design) in large design review mode, the newly-created constraint information is referenced and used. For example, if the user rotates a first component that is mated to a second component, the second component is also moved according to the constraint information. This behavior is the same even after loading the bodies or resolving the components.

Figure 5:
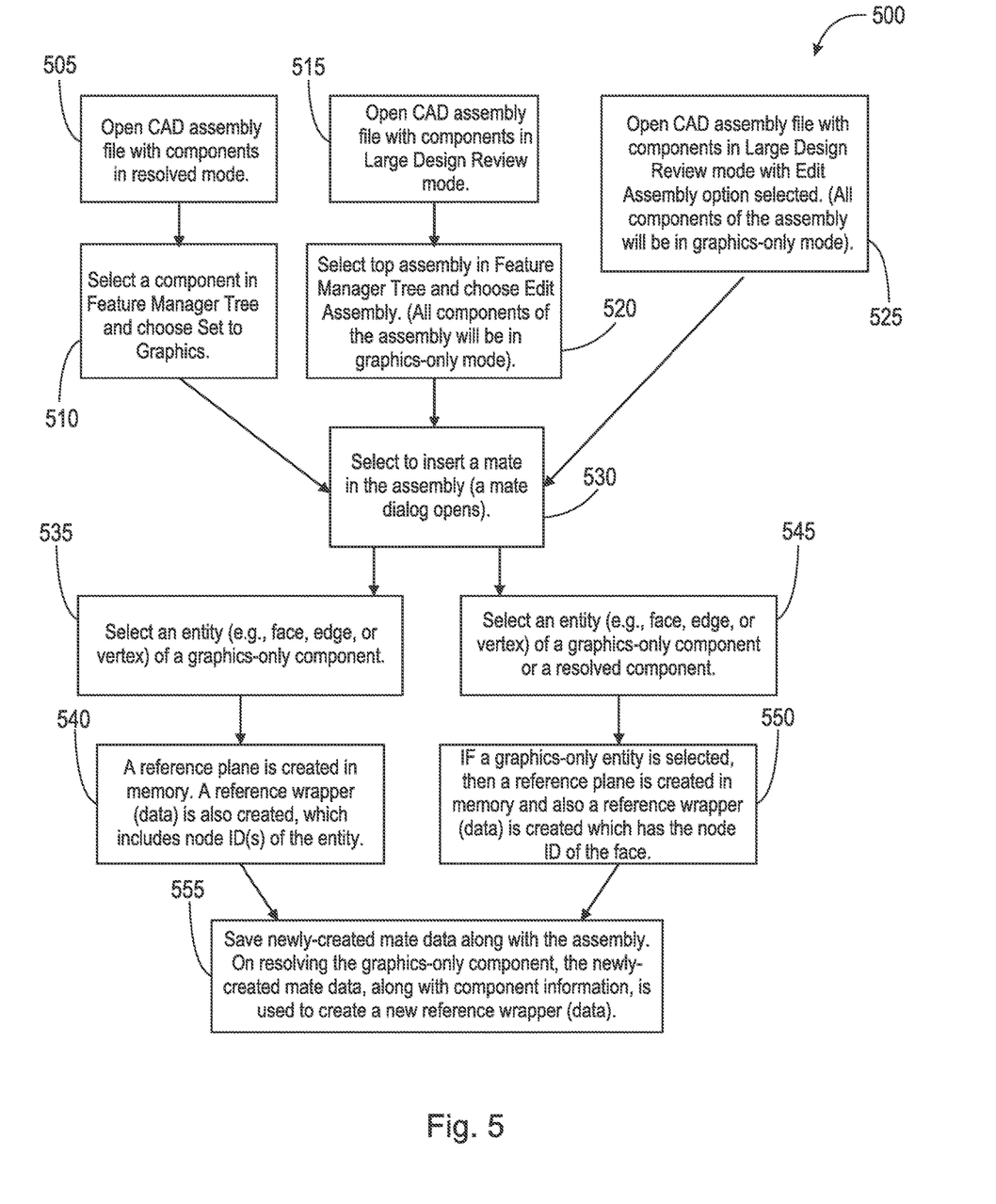
FIG. 5 is a flow diagram illustrating adding constraints between entities in a subject CAD model, according to an example embodiment.

FIG. 5 is a flow diagram illustrating an example method 500 of adding constraints between entities in a subject CAD model, according to an example embodiment. A user of a CAD system may open a CAD assembly file in a number of ways. For example, a CAD assembly file can be opened with its components in resolved mode 505, with its components in large design review mode 515, or with its components in large design review mode and with an "Edit Assembly" option selected 525. If opened in resolved mode (505), the user can select 510 a component of the CAD assembly from a list of components (e.g., a Feature Manager Tree) and can chose to set the component to graphics mode. If opened in large design review mode (515), the user can select 520 the top assembly using, for example, a Feature Manager Tree, and chose to edit the assembly. In any of the above situations, the user can select 530 to insert a mate in the assembly, after which a dialog may open that the user can use to specify mate information. When adding a mate, the user can select 535, 545 an entity (e.g., face, edge, or vertex) of a component loaded in graphics-only mode (e.g., large design review). In creating the mate, a reference plane is created 540, 550 in memory, and a reference wrapper (data for the mate) is also created in memory. The reference wrapper includes the nodes of the selected entity. For example, if the selected entity is a planar face, the reference wrapper can include the node IDs of the face. The newly-created mate data is saved 555 along with the rest of the assembly information. When the component (loaded in graphics-only mode) is resolved, the newly-created mate data is used, in conjunction with the rest of the component information, to create a new reference wrapper for the component that includes the new mate.

Figure 6:
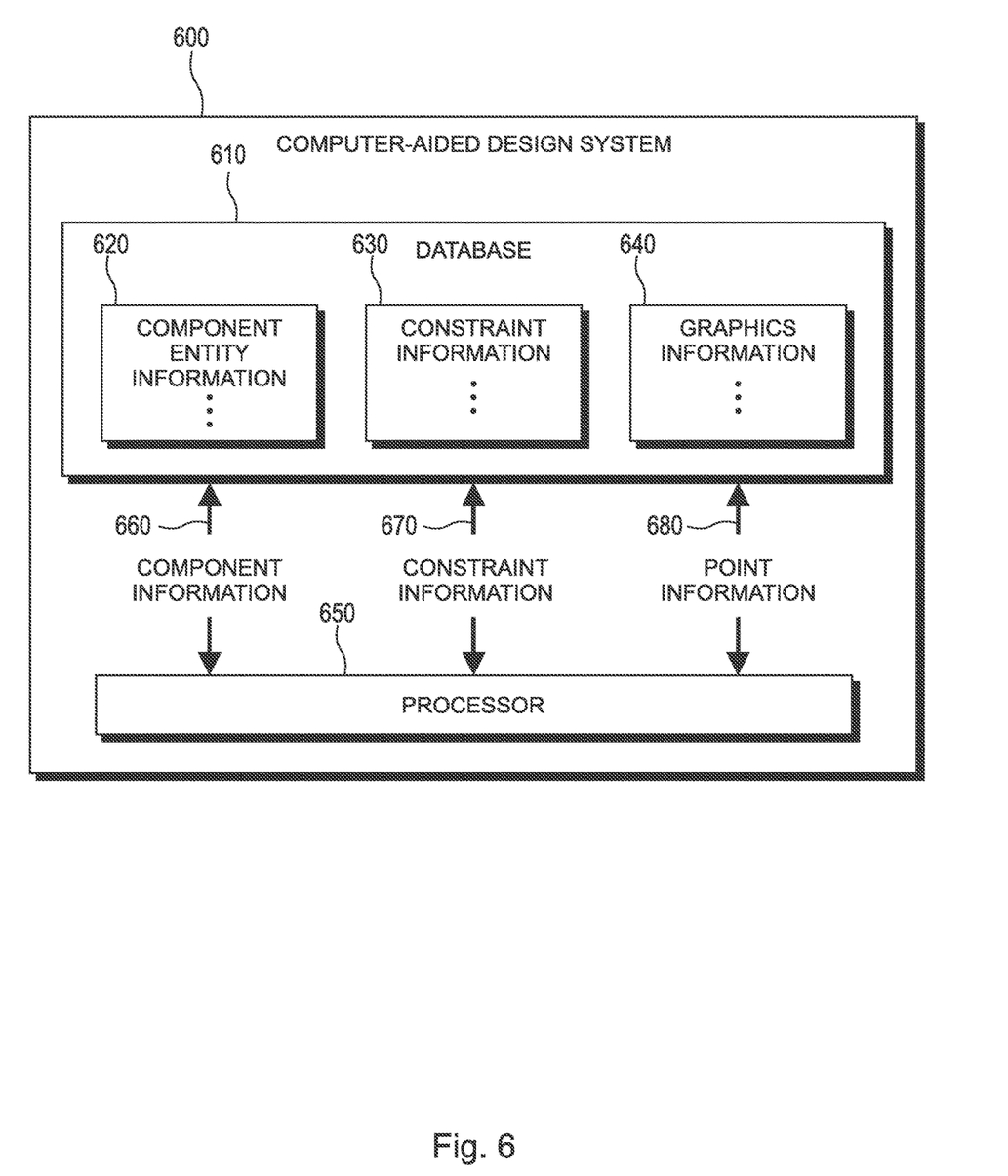
FIG. 6 is a block diagram illustrating a CAD system according to an example embodiment.

FIG. 6 is a block diagram illustrating a computer-aided design system 600 according to an example embodiment. The example system 600 includes a database 610 storing CAD model information, such as component model information 620, constraint information 630, and graphics information 640. The system 600 also includes a processor 650 operatively coupled to the database 610 and that accesses the database 610 to retrieve information regarding the CAD model entities. A graphical representation of the subject CAD model is presented to a user using point information 680 from the graphics information portion 640 of the database 610 without loading bodies of the subject CAD model (without loading component information 660 from the component entity information portion 620 of the database 610). The system enables the user to add a constraint between first and second entities of the subject CAD model, and stores information 670 for the added constraint with the subject CAD model in the constraint information potion 630 of the computer database 610.

Figure 7:
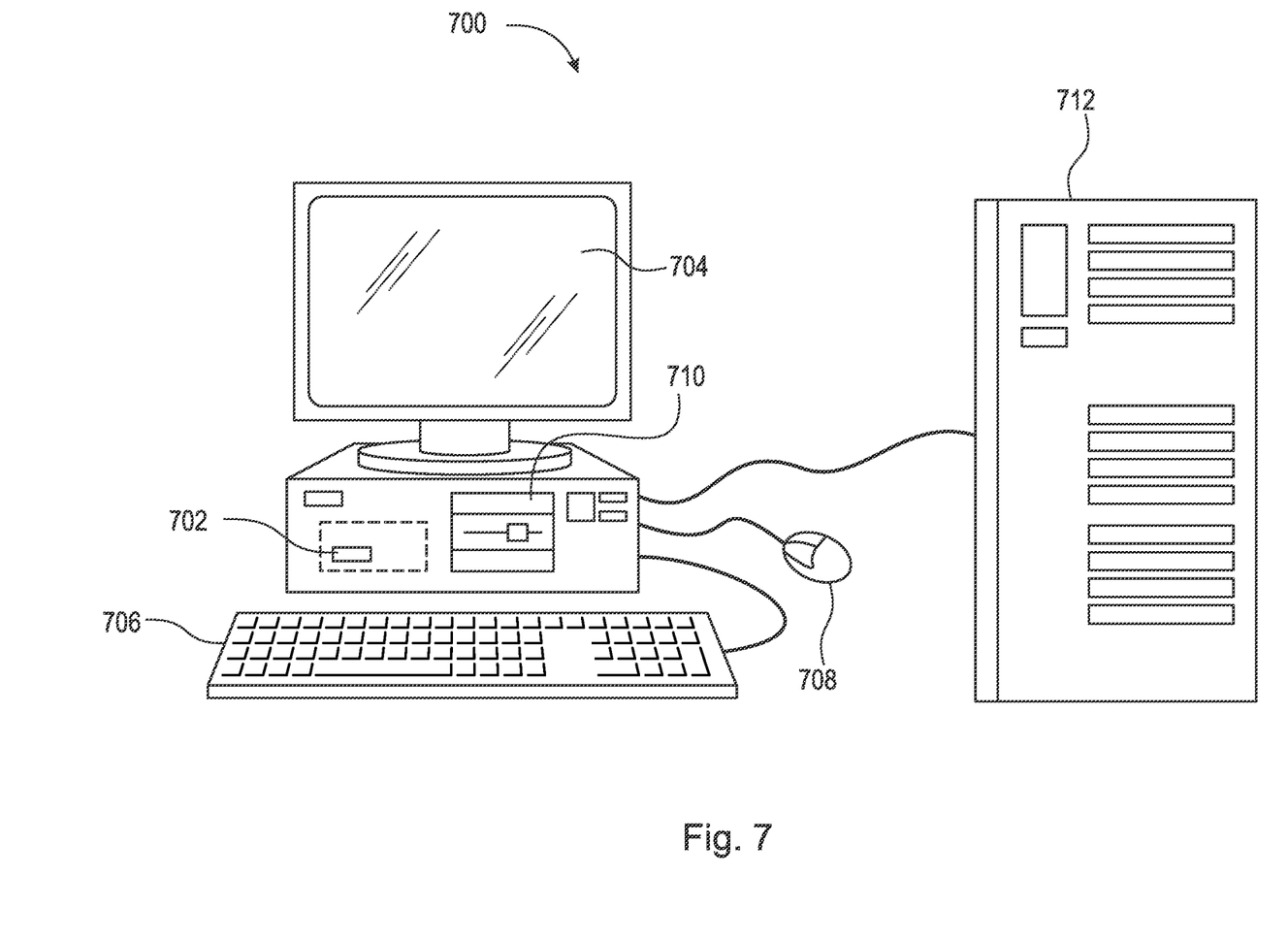
FIG. 7 is a schematic diagram of a computer system in which embodiments may be implemented.

FIG. 7 illustrates a computerized modeling system 700 that includes a CPU 702, a computer monitor 704, a keyboard input device 706, a mouse input device 708, and a storage device 710. The CPU 702, computer monitor 704, keyboard 706, mouse 708, and storage device 710 can include commonly available computer hardware devices. For example, the CPU 702 can include an Intel-based processor. The mouse 708 may have conventional left and right buttons that the design engineer may press to issue a command to a software program being executed by the CPU 702. As an alternative or in addition to the mouse 708, the computerized modeling system 700 can include a pointing device such as a trackball, touch-sensitive pad, or pointing device and buttons built into the keyboard 706. Those of ordinary skill in the art appreciate that the same results described herein with reference to a mouse device can be achieved using another available pointing device. Other appropriate computer hardware platforms are suitable as will become apparent from the discussion that follows. Such computer hardware platforms are preferably capable of operating the Microsoft Windows NT, Windows 2000, Windows XP, Windows ME, Windows 7 et seq., UNIX, Linux, or MAC OS operating systems.

Additional computer processing units and hardware devices (e.g., rapid prototyping, video, and printer devices) may be included in the computerized modeling system 500. Furthermore, the computerized modeling system 500 may include network hardware and software, thereby enabling communication to a hardware platform 512, and facilitating communication between numerous computer systems that include a CPU and a storage system, among other computer components.

Computer-aided modeling software (e.g., processes 400 and 500) may be stored on the storage device 710 and loaded into and executed by the CPU 702. The modeling software allows a design engineer to create and modify a 3D model and implements aspects of the embodiments described herein. The CPU 702 uses the computer monitor 704 to display a 3D model and other aspects thereof as described. Using the keyboard 706 and the mouse 708, the design engineer can enter and modify data associated with the 3D model. The CPU 702 accepts and processes input from the keyboard 706 and mouse 708. The CPU 702 processes the input along with the data associated with the 3D model and makes corresponding and appropriate changes to that which is displayed on the computer monitor 704 as commanded by the modeling software. In one embodiment, the modeling software is based on a solid modeling system that may be used to construct a 3D model consisting of one or more solid and surface bodies.

Embodiments may be implemented in digital electronic circuitry, or in computer hardware, firmware, software, or in combinations thereof. Apparatuses may be implemented in a computer program product tangibly embodied in a machine-readable storage device for execution by a programmable processor; and method steps may be performed by a programmable processor executing a program of instructions to perform functions by operating on input data and generating output. Embodiments may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor receives instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks, such as internal hard disks and removable disks; magneto-optical disks; and CD-ROM disks. Any of the foregoing may be supplemented by, or incorporated in, custom-designed ASICs (application-specific integrated circuits).

An advantage of the embodiments disclosed herein is that a user can add constraints between entities of a very large CAD model without loading all of the component information of the CAD model. This saves time and computer memory usage.

While example embodiments have been particularly shown and described, it will be understood by those skilled in the art that various changes in form and details may be made therein without departing from the scope of the embodiments encompassed by the appended claims. For example, implementations may change the order in which operations are performed. Further, depending on the needs of an implementation, particular operations described herein may be implemented as a combined operation, eliminated, added to, or otherwise rearranged. Further, particular user interface operations relative to a mouse (e.g., click, drag, drop, etc.) are by way of illustration and not limitation. Other user interface operations for selecting, moving, placing, etc., model or design data are suitable.

What is claimed is:

1. A computer-implemented method of adding constraint information between entities in a subject computer-aided design (CAD) model of a real-world object, the method comprising:

accessing graphics information regarding CAD model entities from a computer database, wherein the CAD model entities belong to one or more components of the subject CAD model, and the computer database includes: (i) the graphics information, and (ii) topological data and corresponding geometric data of the one or more components of the subject CAD model;

presenting to a user a graphical representation of the subject CAD model, said graphical representation being based on the accessed graphics information without the topological data and corresponding geometric data of the subject CAD model, wherein the topological data and corresponding geometric data of the subject CAD model remain in the computer database instead of being loaded into memory supporting the graphical representation of the subject CAD model, said presenting resulting in a large design review mode of the subject CAD model;

enabling the user to add a constraint between first and second entities of the subject CAD model while in the large design review mode without the topological data and corresponding geometric data of the subject CAD model; and storing information for the added constraint with the subject CAD model in the computer database.

2. A computer-implemented method as in claim 1 wherein the accessed graphics information includes only point information for the subject CAD model, and wherein presenting the graphical representation of the subject CAD model is based on only the accessed point information for the subject CAD model from the computer database.

3. A computer-implemented method as in claim 1 wherein enabling the user to add the constraint between first and second entities includes:
   in response to the user selecting the first entity, creating a first reference plane in memory;
   in response to the user selecting the second entity, creating a second reference plane in memory;
   enabling the user to specify a type of constraint to be added between the first and second entities; and
   creating constraint information based on the type of constraint specified by the user and the first and second reference planes.

4. A computer-implemented method as in claim 3 wherein enabling the user to specify a type of constraint includes presenting to the user constraint types that are available between the first and second entities selected by the user.

5. A computer-implemented method as in claim 3 wherein creating the first and second reference planes includes:
   accessing node information for the first and second entities from the computer database;
   associating node information for the first entity with the first reference plane; and
   associating node information for the second entity with the second reference plane.

6. A computer-implemented method as in claim 5 wherein creating the constraint information includes creating constraint information including the constraint type specified by the user and the node information associated with the first and second reference planes.

7. A computer-implemented method as in claim 1 wherein storing information for the added constraint includes adding the information for the added constraint to a constraint data stream for the subject CAD model.

8. A computer-aided design (CAD) system comprising:
   a computer database configured to store graphics information regarding CAD model entities, wherein the CAD model entities belong to one or more components of a subject CAD model representing a real-world object, the computer database including: (i) the graphics information, and (ii) topological data and corresponding geometric data of the one or more components of the subject CAD model; and
   a processor operatively coupled to the computer database and configured to:
      access the graphics information regarding the CAD model entities from the computer database;
      present to a user a graphical representation of the subject CAD model, said graphical representation being based on the accessed graphics information without the topological data and corresponding geometric data of the subject CAD model, wherein the topological data and corresponding geometric data of the subject CAD model remain in the computer database instead of being loaded into memory supporting the graphical representation of the subject CAD model, said presenting resulting in a large design review mode of the subject CAD model;
      enable the user to add a constraint between first and second entities of the subject CAD model while in the large design review mode without the topological data and corresponding geometric data of the subject CAD model; and
      store information for the added constraint with the subject CAD model in the computer database.

9. A CAD system as in claim 8 wherein the accessed graphics information includes only point information for the subject CAD model, and wherein the processor is configured to present the graphical representation of the subject CAD model based on only the accessed point information for the subject CAD model.

10. A CAD system as in claim 8 wherein the processor is configured to enable the user to add the constraint between first and second entities by:
   in response to the user selecting the first entity, creating a first reference plane in memory;
   in response to the user selecting the second entity, creating a second reference plane in memory;
   enabling the user to specify a type of constraint to be added between the first and second entities; and
   creating constraint information based on the type of constraint specified by the user and the first and second reference planes.

11. A CAD system as in claim 10 wherein the processor is configured to present to the user constraint types that are available between the first and second entities selected by the user.

12. A CAD system as in claim 10 wherein the processor is configured to create the first and second reference planes by:
   accessing node information for the first and second entities from the computer database;
   associating node information for the first entity with the first reference plane; and
   associating node information for the second entity with the second reference plane.

13. A CAD system as in claim 12 wherein the constraint information includes the constraint type specified by the user and the node information associated with the first and second reference planes.

14. A CAD system as in claim 8 wherein the processor is configured to add the information for the added constraint to a constraint data stream for the subject CAD model.

15. A non-transitory computer-readable data storage medium having computer-readable program codes embodied therein for adding constraint information between entities in a subject computer-aided design (CAD) model of a real-world object, the computer-readable program codes including instructions that, when executed by a processor, cause the processor to:
   access graphics information regarding CAD model entities from a computer database, wherein the CAD model entities belong to one or more components of the subject CAD model, and the computer database includes: (i) the graphics information, and (ii) topological data and corresponding geometric data of the one or more components of the subject CAD model;
   present to a user a graphical representation of the subject CAD model, said graphical representation being based on the accessed graphics information without the topological data and corresponding geometric data of the subject CAD model, wherein the topological data and corresponding geometric data of the subject CAD model remain in the computer database instead of being loaded into memory supporting the graphical representation of the subject CAD model, said presenting resulting in a large design review mode of the subject CAD model;

enable the user to add a constraint between first and second entities of the subject CAD model while in the large design review mode without the topological data and corresponding geometric data of the subject CAD model; and store information for the added constraint with the subject CAD model in the computer database.

16. A computer-readable data storage medium as in claim 15 wherein the accessed graphics information includes only point information for the subject CAD model, and wherein the instructions cause the processor to present the graphical representation of the subject CAD model based on only the accessed point information for the subject CAD model.

17. A computer-readable data storage medium as in claim 15 wherein the instructions cause the processor to enable the user to add the constraint between first and second entities by:

in response to the user selecting the first entity, creating a first reference plane in memory;

in response to the user selecting the second entity, creating a second reference plane in memory;

enabling the user to specify a type of constraint to be added between the first and second entities; and creating constraint information based on the type of constraint specified by the user and the first and second reference planes.

18. A computer-readable data storage medium as in claim 17 wherein the instructions cause the processor to present to the user constraint types that are available between the first and second entities selected by the user.

19. A computer-readable data storage medium as in claim 17 wherein the instructions cause the processor to create the first and second reference planes by:

accessing node information for the first and second entities from the computer database;

associating node information for the first entity with the first reference plane; and associating node information for the second entity with the second reference plane.

20. A computer-readable data storage medium as in claim 19 wherein the constraint information includes the constraint type specified by the user and the node information associated with the first and second reference planes.

21. A computer-readable data storage medium as in claim 15 wherein the instructions cause the processor to add the information for the added constraint to a constraint data stream for the subject CAD model.

* * * * *